United States Patent
Sager

[11] Patent Number: 5,810,288
[45] Date of Patent: Sep. 22, 1998

[54] HIGH VELOCITY PROPELLER

[76] Inventor: William F. Sager, 1552 John Anderson Dr., Ormond Beach, Fla. 32074

[21] Appl. No.: 492,819

[22] Filed: Jun. 20, 1995

[51] Int. Cl.[6] .............................. B64C 11/18; B64C 11/46; B63H 1/26; B63H 5/08
[52] U.S. Cl. ................................ 244/65; 244/68; 244/69; 416/176 A; 440/67
[58] Field of Search .................................. 244/64, 65, 68, 244/69; 416/176 A, 177, 176 R; 114/388, 272, 151; 440/67, 38, 70; 406/59

[56] References Cited

U.S. PATENT DOCUMENTS

| | | | |
|---|---|---|---|
| 3,425,640 | 2/1969 | Kletschke et al. | 406/59 |
| 3,605,672 | 9/1971 | Strumbos | 440/67 |
| 5,108,275 | 4/1992 | Sager | 418/201.3 |
| 5,181,868 | 1/1993 | Gabriel | 440/67 |

*Primary Examiner*—Vima Lissi Mojica
*Attorney, Agent, or Firm*—Gerstman, Ellis & McMillin, Ltd.

[57] ABSTRACT

A propeller for fluid propulsion (such as air or water) comprises a pair of substantially rigid blades. The blades are mounted for rotation about respective, separate, parallel rotation axes, with the axes being also substantially parallel to the longest dimension of the blades. The blades each define a plate that is oppositely helically twisted along the longest blade dimension compared with the other blade. The blades are positioned together in synchronously opposite, rotatable condition, with the rotating blades passing by each other in closely spaced relation without physical contact. A tubular housing encloses the rotating blades in closely-spaced relation between the housing and blades. Such a blade system can provide a high velocity jet of large mass at relatively low rotational speed.

20 Claims, 1 Drawing Sheet

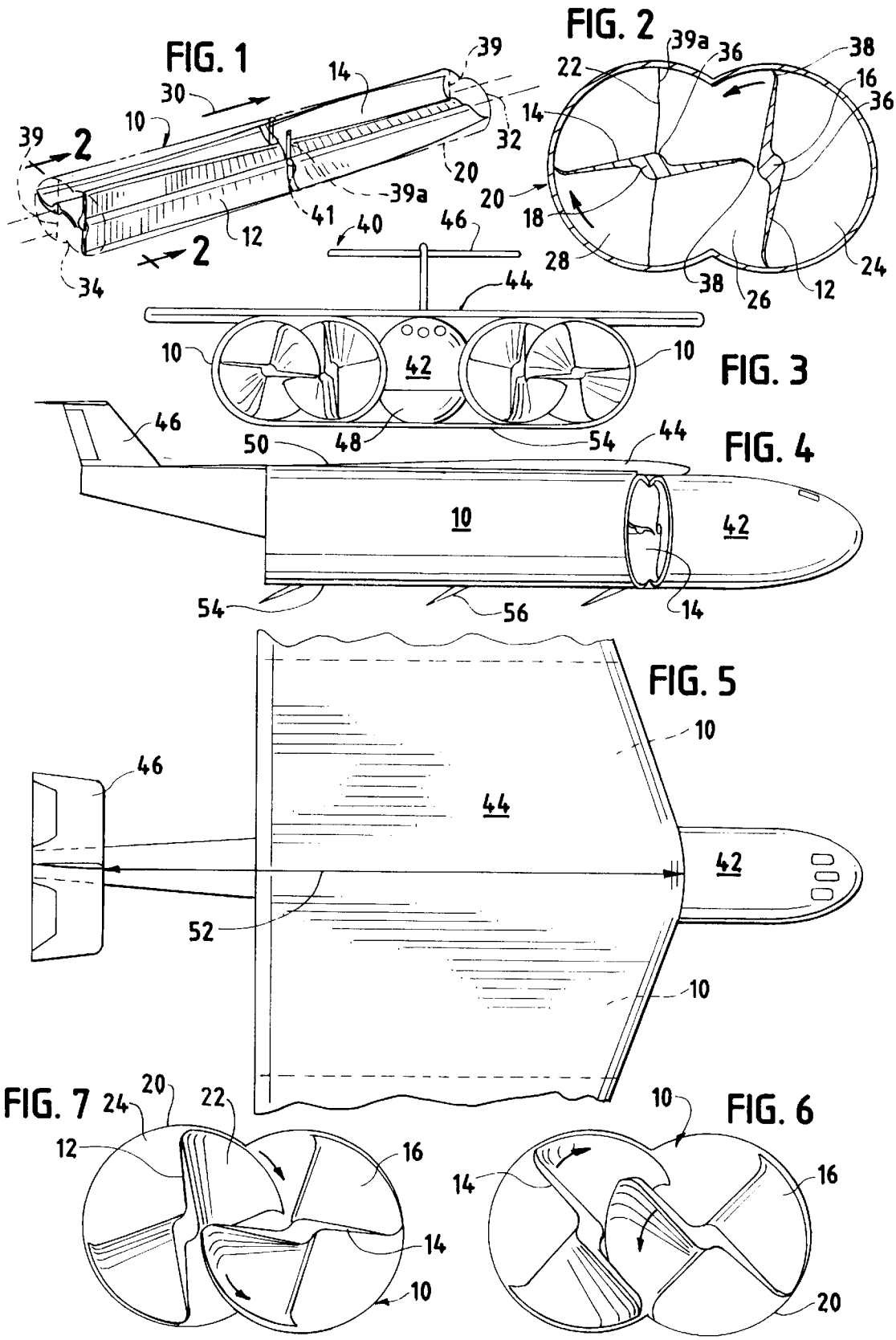

HIGH VELOCITY PROPELLER

BACKGROUND OF THE INVENTION

Propellers are of course widely used in aircraft and in boat propulsion. Additionally, turbine blades, of which wind power devices are a subset, also use what may be viewed as propellers. In all of these uses, the propeller comprises some blades that rotate about a center and project radially outwardly from the axis of rotation, while defining surfaces that are angled to fluids passing parallel to the axis of rotation, to be driven in a rotary direction by the fluids or to drive the fluid as desired.

In accordance with this invention, a fundamentally different approach to fluid propulsion is provided from that illustrated by the various embodiments of conventional propellers. By this invention, rotating blades either propel or are propelled by a moving fluid, as is conventional. However, by this invention a greatly increased quantity of fluid can be propelled at a greatly increased velocity, other things being equal, when compared with propellers of prior, conventional types and of comparable diameter. Furthermore, the acceleration of fluids to high speeds can be done at a relatively low rotational speed of the propeller of this invention. This makes possible the acceleration of gasses to supersonic speeds while the rotating propeller blades of this invention remain at subsonic speeds, providing significant advantages in jet propulsion for aircraft and the like. Similar advantages can be achieved in the propulsion of watercraft by this invention. Furthermore, the turbulence of the fluid being propelled is significantly lower with the device of this invention, when compared with the propulsion of fluid by the conventional propellers of the prior art.

DESCRIPTION OF THE INVENTION

By this invention a propeller is provided for fluid propulsion which comprises a pair of substantially rigid blades, with the blades being mounted for rotation about respective, separate, substantially parallel, rotation axes. Contrary to conventional propellers, the rotation axes are also substantially parallel to the longest dimension of the blades. This propeller can be used for airplanes, boats, and the like, and to make high capacity pumps for liquids or gasses.

The blades each define a substantially flat plate that is oppositely, helically twisted along the longest blade dimension, the opposite twisting being with respect to the other of the pair of blades. The blades are positioned together in rotationally linked (synchronously) opposite, rotatable condition so that one blade rotates clockwise and the other blade rotates counterclockwise at identical r.p.m., with the helical, rotating blades passing by each other in closely spaced relation without physical contact. It is preferred for the spacing of the respective blades to be as close as possible to minimize fluid leakage between those spaces, while still permitting them to rotate under all conditions of use without the physical contact.

Also, a tubular housing encloses the rotating blades in similar, closely-spaced relation between the housing and the blades. Here also it is desirable for the spacing to be as close as possible while still preventing the blades from striking the housing as they rotate.

The blades may be basically rectangular in shape, with rounded ends if desired, with the helical twist of the blades being substantially uniform along its length, although if desired one section of the blades may have a greater degree of helical twist than another section. It is particularly preferred for the blades to be helically twisted along their length by a total angle of 90°, multiplied by an integer, which integer is preferably 1. However, a 180° twist, a 270° twist, etc. is also suitable, or any other degree of twist which assures that the blades may be closely spaced, yet do not strike each other upon rotation, so as to create a plurality of chambers adjacent to the rotating, helical blades, defined between the helical blades and the tubular housing, as particularly shown in the drawings.

Fluid in the chambers thus defined between the helical blades and the housing is thus impelled in a direction which is overall parallel to the axes of rotation of the blades. With a 90° helical blade twist, a molecule of fluid is theoretically propelled by the rotating blades a distance equal to the entire length of the rotating blades upon 90° of rotation of such blades. Thus, except for losses for leakage, friction, turbulence and the like, fluid will be propelled from one end of the blades to the other at a velocity which is the product of four times the blade length multiplied by the rotational velocity. Hence, a high velocity, high volume fluid jet of low turbulence may be created by the rotating blade system of this invention.

It is preferred for each rotation axis of each blade to extend centrally along the blade, so that the rotation of the blade is about a center line thereof.

It is preferred for the separate, rotating, helical blades to be oriented so that essentially each segment of the helical or twisted blades, taken along the longest dimension of the blades, is substantially perpendicular in some point of the rotation to the corresponding segment of the other blade of the pair.

The blades of this invention preferably have a length that is at least twice the blade width. Preferably, the blade length is at least 2½ times the blade width. It can be seen that the capacity of the propeller system of this invention to accelerate fluid increases with the length of the blades relative to their width, so it is believed that higher performance propellers in accordance with this invention will be relatively longer.

Also, the rotational velocity of the rotating blades of this invention at their peripheries is preferably no more than ½ of the theoretical velocity (excluding once again losses for leakage, turbulence, and friction) of fluid propelled through the propeller of this invention at that rotational velocity. Thus, it becomes possible with the propeller of this invention to create a jet of supersonic velocity, while the blades rotate at subsonic velocity, to avoid the known difficulties encountered when turbine blades or the like have portions thereof which are rotating at the speed of sound.

It should be noted that because the area of the blades of this invention is very large compared with ordinary propellers, a large impulse may be given to the fluid being propelled therethrough. The fluid motion does not deviate greatly from the axial direction, with the result that turbulence is minimized. Thus, a simple, light-weight propeller drive is provided which is capable of handling enormous quantities of fluid while being of simple construction, and without having demanding tolerances as required by airplane engine turbines.

Because any drive powered by fluid jets increases in efficiency with the mass of the fluid accelerated, the propeller of this invention can operate at a very high efficiency, both as a propulsion system for aircraft and for ships, particularly submarines. Also, the propeller may be used as a substitute for a large variety of turbines, for example for use in wind driven power generation or the like.

While the blades used in this invention are preferably substantially flat, apart from their helical twist, the blades may in transverse cross-section each define a peripheral, curved arc of no more than 90°, and preferably about 30° to 60°, bending toward the direction of rotation, for turbulence reduction. Additionally, the plates may comprise an enlarged, central portion about the axis of rotation for structural engineering purposes, with each side of each plate being substantially flat, but displaced in a direction perpendicular to the rotational axis, relative to the side of the plate found on the other side of the rotational axis.

The propeller of this invention, and preferably an even number thereof such as a pair of propellers, may be used to propel an airplane which comprises a fuselage and a wing connected to the fuselage, the wing defining an upper surface having a length which is essentially at least equal in dimension to the transverse span of the wing. Such a wing, coupled with the high jet velocity propellers of this invention, comprises an aircraft design which exhibits an capacity for ultrahigh speed travel at ultrahigh altitudes. This results from the capacity of the propellers of this invention to accelerate large quantities of air to supersonic velocities, while the propeller itself does not operate at supersonic speeds.

It should also be noted that the propeller of this invention gains efficiency because its profile to oncoming fluids is of greatly reduced area, when compared with conventional props and turbines. Furthermore, the blades of this invention are much more sturdy then conventional turbine blades, so that they can avoid damage in many circumstances, such as an encounter with a large bird in the air or an object in the water of a type that can damage conventional propellers. For example, with an airplane engine in accordance with this invention, a bird can pass entirely through the engine without damage to the engine.

DESCRIPTION OF THE DRAWINGS

FIG. 1 is a perspective view, with certain parts removed, of one embodiment of the propeller of this invention;

FIG. 2 is a sectional view taken along line 2—2 of FIG. 1, showing only structure in the sectional plane except for a support strut;

FIG. 3 is an elevational view of an airplane which carries a pair of the propellers of this invention;

FIG. 4 is a side elevational view of the airplane of FIG. 3;

FIG. 5 is a plan view of the airplane of FIGS. 3 and 4, with outer wing portions removed; and FIGS. 6 and 7 are each front elevational views of the propeller of this invention showing the pair of rotary blades in differing rotational positions.

DESCRIPTION OF SPECIFIC EMBODIMENTS

Referring to the drawings, a propeller 10 is provided for fluid propulsion, specifically air in the embodiment shown, although a similar propeller may be used for the underwater propulsion for a submarine or other boat.

Propeller 10 comprises a pair of substantially rigid blades 12, 14 mounted for rotation about respective, separate, parallel rotation axes 16, 18. Axes 16, 18 can be seen to be parallel to the longest dimension of the blades 12, 14.

Each blade defines a substantially flat plate which is helically twisted along the longest blade dimension as particularly shown in FIG. 1. The helical twist of each of the respective blades 12, 14 is opposite to that of the other. Specifically, the helical twist of blade 12 from the viewpoint of FIG. 2 is counterclockwise, while the helical twist of blade 14 from the same viewpoint is clockwise. The blades may be rotated by a chain drive or a gearing system that causes them to rotate at exactly the same speed but in the opposite rotary sense, with the rotary blades passing by each other in closely spaced relation without physical contact. This may be accomplished when the blades are helically twisted along their length by a total angle of 90°, or if desired 180° or 270°, for example.

A tubular housing 20 is provided, having a bore of roughly a figure 8 shape, and with the rotating blades 12, 14 having their tips 38 in closely-spaced relation with the wall of housing 20.

It can be seen from FIG. 2 that a series of chambers 22, 24, 26, 28 are formed, which chambers are of constantly changing position and shape as the blades 12, 14, rotate. Because of the twist in the blades, shown herein as a 90° twist, the opposite rotation of the blades in chambers 22, 24 for example causes compression of the fluid therein, while expansion is taking place in chamber 28, speaking in a broad sense because the situation is more complex than that. Because of the twist of the blades and the direction of rotation, fluid is impelled in the direction of arrow 30 within housing 20. The rotational components produced by the rotating blades are cancelled so that the net flow is axial. Thus, the rotating blades can provide a strong jet of fluid proceeding out the rear end 32 of housing 20, with fluid suction into the housing taking place at end 34.

The pitch of blades 12, 14 varies of course with the length of the blades in direction 30, for example when a constant 90° twist is provided. If the pitch of the blades is such that the linear velocity of the outer edge of the rotating blades is less than theoretical axial velocity of fluids propelled by the blades by a large factor, it becomes possible to create high jet velocities, even supersonic jet streams of particularly gas impelled out of end 32, while the peripheries of blades 14, 16 rotate at a subsonic rate.

It can also be noted that the area of blades 12, 14 is extremely large compared to the area of ordinary propellers. Thus, a large impulse may be given to the fluid, with the jet stream emitted having a relatively low turbulence compared with the turbulence provided by propellers and turbines.

It can also be seen that the cross sectional area of blades 14, 16 is very low compared with conventional propellers and turbines, as particularly shown in FIG. 2. Thus, the propeller of this invention is capable of handling very large quantities of fluid, yet is of simple construction and without demanding tolerances. Because fluid jet drives increase in efficiency with the mass of the fluid accelerated, propeller 10 can exhibit substantially increased efficiency levels when compared with conventional propellers and turbines, since the propeller is capable of accelerating increased masses of fluids compared with propellers and turbines of similar radius.

Specifically, each blade may have a width of 2.5 meters and a length (in direction 30) of 7.85 meters. A central, integral shaft 36 is defined by each of the blades which shaft may have a diameter of 0.3 meter, and may be hollow if desired. Housing 20 may have a maximum cross-sectional dimension of 3.15 meters.

The above propeller 10 of this invention, if mounted in an airplane and emitting a gas jet at 800 miles per hour, will pass a mass of 7237 kilograms of air per second through the propeller when rotating at 684 rpm at sea level. The propeller will be generating a thrust from the jet of 65,972 kilograms, excluding adjustments for frictional and shock wave energy losses. At 66,000 feet, calculations indicate that the above propeller 10 of this invention, when operating at 1,179 rpm will generate a gas jet speed of 1,380 mph and will pass 941 kilograms of air per second. The thrust generated is calculated at 17,156 kilograms. In both of these cases the rotation speed of the lateral peripheries 38 of blades 12, 14 remains subsonic, even though the velocity of the gas jet created is supersonic. The reason for this is that the theoretical velocity to which gas is accelerated upon passing through propeller 10 in its specifically described embodiment is more than 31 meters per second per rotation of the blades per second. Thus at 10 rotations per second, the theoretical jet velocity is more than 310 meters per second.

Peripheral, lateral edges 38 of the blades 12, 14 may define a peripheral, curved arc as shown in FIG. 2 of typically about 30°–60°, for turbulence reduction. Arced edges 38 are concave in the direction of motion.

Propeller 10 may also define struts 39 that retain blades 12, 14 in their rotary position. Struts 39 may be in a journalled relationship to permit the rotation. Typically, the struts 39 are provided at the respective ends of the blades, but in the case of long blades, if necessary, central struts 39a may be provided as shown along with slots 41 in the blades to permit blade rotation in the presence of struts 39a.

Turning to FIGS. 3 to 5, an airplane 40 is disclosed carrying a pair of the propellers 10 of this invention. The airplane 40 may be generally of conventional construction except as otherwise indicated herein, having a fuselage 42, a wing 44, and a stabilizer 46. Motor 48 may be hydraulically connected with propellers 10 to drive them.

While propellers 10 may be powered with a conventional motor carried on or in the housing 20 of each motor 10, in the specific embodiment shown, a separate motor may be provided, as well as a hydraulic drive using conventional principles to provide powered rotation in synchronous manner to the blades 14 of propeller 10.

Wing 44 may differ from what is conventional by having an upper surface 50, defining an airfoil as shown which is of a length 52 which is at least substantially equal in dimension to the transverse span of wing 44. Specifically, wing 44 extends for a distance at least the length of propellers 10, and farther if desired.

A lower wing-like member 54 is provided below propellers 10, with wing-like member 54 providing additional lift if desired by means of a concave shape, providing a reverse air foil. Also, retractable baffles or flaps 56 may be provided for the usual purposes of flaps, but which also may provide an effective ground effect lift as the airplane is coming in for a landing, which can significantly increase the lift close to the ground and thus reduce the minimum landing speed.

Referring to FIGS. 6 and 7, a propeller 10 is shown in elevation, with the blades 12, 14 being in two different elevational positions, to show the relationship of the twisted blades. They are shown from the rear end 32, showing two different positions of how the blades interengage with each other to form pressure chambers. Chamber 22 is a pressurized area, with fluid in that area being driven rearwardly with great force by the advancing blade portion of blade 12. Chamber 24 is an area where reduced or suction pressure is found, with the pressure being directed in the same direction as the impulse of chamber 22.

Thus, a propeller is provided which differs significantly from propellers and turbines currently in use, and which exhibits significant potential advantages.

That which is claimed is:

1. A propeller for fluid propulsion which comprises a pair of substantially rigid blades, said blades being mounted for rotation about respective, separate, parallel rotation axes, said axes being also substantially parallel to the longest dimension of said blades, said blades each being oppositely helically twisted along said longest blade dimension compared with the other blade, said blades being positioned together in synchronously opposite, rotatable condition, with the rotating blades rotating in close proximity relative to each other, in interengaging manner and a tubular housing substantially completely laterally enclosing said rotating blades in closely-spaced relation between the housing and blades, said housing having open ends.

2. The propeller of claim 1 in which said blades are helically twisted along their length by a total angle of substantially 90° multiplied by an integer.

3. The propeller of claim 1 in which each rotation axis of each blade extends centrally along said blade.

4. The propeller of claim 1 in which during rotation of said blades essentially each segment of the twisted blades along said longest dimension is substantially perpendicular in some point of the rotation to the corresponding segment of the other blade of said pair.

5. The propeller of claim 1 in which said blades are at least 5 feet long and at least 2 feet wide.

6. An airplane which carries and is propelled by the propeller of claim 1.

7. An airplane which carries and is propelled by a propeller which comprises a pair of substantially rigid blades, said blades being mounted for rotation about respective, separate, parallel rotation axes, said axes being also substantially parallel to the longest dimension of said blades, said blades each being oppositely helically twisted along said longest blade dimension compared with the other blade, said blades being positioned together in synchronously opposite, rotatable condition, with the rotating blades rotating relative to each other in close proximity, and a tubular housing laterally enclosing said rotating blades in closely-spaced relation between the housing and blades, said housing having open ends, said airplane also comprising a fuselage, and a wing connected to the fuselage, said wing having an upper surface of a length which is at least essentially equal in dimension to the transverse span of said wing.

8. The method of rotating the propeller of claim 1 in which the linear velocity at the periphery of said rotating blades is no more than one half of the theoretical velocity of fluid propelled through said propeller.

9. The propeller of claim 1 in which each blade is a substantially flat plate having a length that is at least twice its width.

10. The propeller of claim 1 in which each blade, or part thereof, in transverse cross-section, defines a peripheral, curved arc of not more than 90° for turbulence reduction.

11. A propeller for fluid propulsion which comprises a pair of substantially rigid blades, said blades being mounted for rotation about respective separate, parallel rotation axes extending centrally along said blade, said axes being also substantially parallel to the longest dimension of said blades, said blades each defining a substantially flat plate that is oppositely helically twisted along said longest blade dimension compared with the other blade, the degree of helical twist along the length of each blade being a total angle of substantially 90° multiplied by an integer, said blades being positioned together in synchronous, opposite, rotatable condition, with the blades rotating in close proximity relative to each other in interengaging manner, and an open ended, tubular housing substantially completely laterally enclosing said rotating blades in closely-spaced relation between the housing and blades, said housing being of substantially a figure 8 cross-sectional shape, whereby the tips of said rotating blades are in closely-spaced relation with the wall of the housing for more than half of their rotation.

12. The propeller of claim 11 in which, during rotation of said blades essentially each segment of the twisted blades along said longest dimension is substantially perpendicular in some point of the rotation to the corresponding segment of the other blade of said pair.

13. The propeller of claim 12 in which said blades are at least five feet long and at least two feet wide.

14. The propeller of claim 13 in which each blade in transverse cross-section defines a peripheral, curved arc of not more than about 60° for turbulence reduction.

15. The airplane of claim 7 in which the blades of said propeller are helically twisted along their length by a total angle of substantially 90° multiplied by an integer.

16. The airplane of claim 15 in which each rotation axis of each blade extends centrally along said blade.

17. The airplane of claim 16 in which, during rotation of said blades, essentially each segment of the twisted blades along said longest dimension is substantially perpendicular in some point of the rotation to the corresponding segment of the other blade of said pair.

18. The airplane of claim 17 in which said blades are at least five feet long and at least two feet wide.

19. The airplane of claim 18 in which each blade, or part thereof, in transverse cross-section, defines a peripheral, curved arc of not more than 90° for turbulence reduction.

20. The propeller of claim 1 in which said tubular housing is of substantially a figure 8 cross-sectional shape, whereby the tips of said rotating blades are in closely-spaced relation with the wall of the housing for more than half of their rotation.

* * * * *